United States Patent
Underwood et al.

(10) Patent No.: US 9,665,852 B2
(45) Date of Patent: May 30, 2017

(54) WATER PURIFICATION UNIT (71) Applicant: VWS (UK) Limited, Bucks (GB)

(72) Inventors: Lee Underwood, Buckinghamshire (GB); Alan Denton Mortimer, Oxfordshire (GB); Mathew Hammond, Oxfordshire (GB)

(73) Assignee: VWS (UK) LTD., Marlow Bucks (GB)

( * ) Notice: Subject to any disclaimer, the term of this patent is extended or adjusted under 35 U.S.C. 154(b) by 515 days.

(21) Appl. No.: 14/276,600

(22) Filed: May 13, 2014

(65) Prior Publication Data

US 2015/0332181 A1 Nov. 19, 2015

(51) Int. Cl.
C02F 1/20 (2006.01)
C02F 1/32 (2006.01)
(Continued)

(52) U.S. Cl.
CPC ............ G06Q 10/20 (2013.01); B01D 37/00 (2013.01); B01D 61/10 (2013.01); B01J 49/00 (2013.01);
(Continued)

(58) Field of Classification Search
CPC .... C02F 9/00; C02F 1/008; C02F 1/32; C02F 1/441; C02F 1/42; C02F 1/4695; C02F 1/20; C02F 1/28; C02F 1/44; C02F 2209/44; C02F 2209/445; C02F 2303/14; C02F 2303/16; G06Q 50/06; G06Q 10/0631; G06Q 10/20; G06Q 10/30; G01N 1/40; G01N 1/4005; G01N 1/4007; G01N 2001/4011; G01N 2001/4016; G01N 2001/4038; B01L 3/54; B01L 3/56; B01L 3/58; B01L 9/00; B01L 99/00; B01J 20/34; B01J 49/00; B01J 49/80; B01J 49/85; B01D 24/46; B01D 24/4876; B01D 36/00; B01D 36/02; B01D 37/00; B01D 37/04;
(Continued)

(56) References Cited

U.S. PATENT DOCUMENTS 2,987,187 A * 6/1961 Comroe ................. B01J 47/024
 210/244
5,788,826 A * 8/1998 Nyberg .................... B01J 47/08
 204/536
(Continued)

FOREIGN PATENT DOCUMENTS

JP 2000266763 A 9/2000

Primary Examiner — Joseph Drodge
(74) Attorney, Agent, or Firm — Drinker Biddle & Reath LLP (57) ABSTRACT

A system is disclosed for facilitating maintenance of water treatment apparatus at multiple locations and which include multiple components designed with an operational life that is greater than an apparatus exchange duration. The system includes tracking the usage of each component and determining an exchange date for an existing apparatus. A refurbished apparatus is sent to the location when the existing apparatus is at or near its exchange date. The operational life remaining for each component in the existing apparatus is determined based on the usage of the component. Each component that has operational life remaining that is less than the exchange duration for use as a refurbished apparatus is removed and replaced or refurbished so as to create a refurbished unit.

8 Claims, 5 Drawing Sheets

(51) Int. Cl.
*C02F 1/42* (2006.01)
*C02F 1/44* (2006.01)
*G06Q 50/06* (2012.01)
*B01J 49/00* (2017.01)
*B01D 37/00* (2006.01)
*B01D 61/10* (2006.01)
*G06Q 10/00* (2012.01)
*G06Q 10/06* (2012.01)
*C02F 1/00* (2006.01)
*C02F 9/00* (2006.01)
*C02F 1/469* (2006.01)

(52) U.S. Cl.
CPC ............... *C02F 1/008* (2013.01); *C02F 9/00* (2013.01); *G06Q 10/0631* (2013.01); *G06Q 50/06* (2013.01); *C02F 1/20* (2013.01); *C02F 1/32* (2013.01); *C02F 1/42* (2013.01); *C02F 1/441* (2013.01); *C02F 1/4695* (2013.01); *C02F 2209/44* (2013.01)

(58) Field of Classification Search
CPC ...... B01D 61/02; B01D 61/025; B01D 61/04; B01D 61/10; B01D 2201/52; B01D 2311/04; B01D 2311/2623; B01D 2311/2684; B01D 2311/2619; B01D 2311/2653
USPC ....... 95/241; 96/155, 156; 210/91, 141, 142, 210/143, 243, 259; 204/630, 632, 204/518–520, 542; 422/527, 534, 535
See application file for complete search history.

(56) References Cited

U.S. PATENT DOCUMENTS

| | | | | |
|---|---|---|---|---|
| 6,332,110 | B1* | 12/2001 | Wolfe | B01D 61/12 210/141 |
| 6,461,512 | B1* | 10/2002 | Hirayama | B01D 65/022 204/524 |
| 7,749,380 | B2* | 7/2010 | Yungner | B60P 3/14 135/88.13 |
| 7,790,022 | B2* | 9/2010 | Underwood | B01D 35/143 210/143 |
| 7,824,543 | B2* | 11/2010 | Larkner | C02F 1/008 210/109 |
| 8,118,997 | B2* | 2/2012 | Ebrom | H04L 69/26 210/141 |
| 8,486,275 | B2* | 7/2013 | Wolf | C02F 9/00 210/241 |
| 2001/0050786 | A1* | 12/2001 | Curtis | G03H 1/0256 359/6 |
| 2003/0034292 | A1* | 2/2003 | Rela | B01D 61/025 210/321.6 |
| 2003/0168389 | A1* | 9/2003 | Astle | B01D 27/101 210/85 |
| 2007/0050157 | A1* | 3/2007 | Kahn | G01N 33/18 702/55 |
| 2008/0109175 | A1* | 5/2008 | Michalak | C02F 1/008 702/50 |
| 2008/0217256 | A1* | 9/2008 | Everton | C02F 1/001 210/741 |
| 2010/0163489 | A1* | 7/2010 | Bauder | C02F 9/00 210/652 |
| 2010/0332149 | A1* | 12/2010 | Scholpp | C02F 1/008 702/25 |
| 2011/0226684 | A1* | 9/2011 | Underwood | G05B 15/02 210/141 |
| 2012/0000858 | A1* | 1/2012 | Butler | C02F 1/003 210/741 |
| 2012/0318722 | A1* | 12/2012 | Guess | B01D 35/143 210/85 |
| 2012/0318723 | A1* | 12/2012 | Guess | B01D 35/143 210/85 |
| 2013/0037477 | A1* | 2/2013 | Parke | B01J 47/08 210/241 |
| 2013/0046503 | A1* | 2/2013 | Huang | G06F 11/3672 702/117 |
| 2013/0073611 | A1* | 3/2013 | Wolfe | G01N 33/18 709/203 |
| 2014/0202948 | A1* | 7/2014 | Li | C02F 1/002 210/251 |
| 2015/0363750 | A1* | 12/2015 | Svensson | G05B 23/0235 702/34 |
| 2016/0096741 | A1* | 4/2016 | Lee | B01D 1/2896 202/185.1 |
| 2017/0088442 | A1* | 3/2017 | Everson | C02F 1/42 |

* cited by examiner

WATER PURIFICATION UNIT

FIELD OF THE INVENTION

The present invention relates a water purification unit that is designed and constructed to operate in a location in a regular manner for a set period before being rapidly exchanged, the removed unit being refurbished before being re-installed at the same or another site at a later date.

BACKGROUND

Water purification apparatus and units for use in laboratories and healthcare facilities are well known. One of their applications is to feed analysers such as clinical analysers that carry out one or more test on a sample in a standard repetitive automated process. A set amount of water is required during this process to make solutions, to dilute solutions and/or to rinse out the lines, vessels, probes and other equipment that make up the analyser. One water purification apparatus can be used to feed several individual clinical analysers or several module parts of one or more analysers. JP2000266763 disclosed a water purification apparatus incorporated into the body of an analyser.

Clinical analysers are well known in the art, generally being medical laboratory instruments able to analyse a sample, generally a medical sample, to determine one or more characteristics in or for a clinical purpose. One example is an analyser able to measure the properties of bodily fluids such as blood or urine, to assist in diagnosis of a condition or disease of a patient.

Clinical analysers, with their increasing automation, can provide faster and more accurate and more wide ranging information to a user or operator or to medical personnel, and are being increasingly used in research, hospitals, medical laboratories and similar faculties, often in batch processing environments.

Generally, water purification units involve the reduction and/or removal of contaminants and impurities to very low levels. The units contain a variety of technologies that remove particles, colloids, bacteria, ionic species and organic substances. These technologies last a varied length of time before requiring the replacement of parts due to either wear or by being exhausted of operational capacity. These time periods vary depending upon the technologies used and the interactive effect of the combinations of technologies used within the components within the water purification unit. Some components require infrequent changes such as pumps, tubes or reverse osmosis membranes while other items may require more frequent attention such as depth filters or ion exchange cartridges.

These more frequently changed cartridges are usually changed out by the on-site operator when an alarm from the water purification unit indicates that the removal capacity of the component has been used up. This may be based upon time, usage or as detected by sensors built into the water purification unit.

The less frequently changed items are usually changed on site when a fault arises with the component. These actions typically require the services of a trained water purification unit service engineer who may take some time before being able to respond to a fault. Alternatively they may be changed as part of a preventative maintenance schedule but again require the services of a trained water purification unit service engineer.

These requirements for repeated interactions with parts of the water purification unit lead to a requirement for on-site personnel, such as the operators of the analysers, to have some knowledge of the working processes and alarms of the water purification unit. For units with complex alarm systems, site engineers trained in all the processes and functions of the water purification unit may be required. The repeated interactions with the water purification unit also lead to repeated periods when water is unavailable to the analyser resulting in a productivity loss of that analyser.

SUMMARY OF THE INVENTION

It is the purpose of this invention to minimise these issues by having a water purification unit that is designed so that all the components last for a set period, typically 1 year or more, and then the water purification unit is designed to be removed from site and replaced with a new or refurbished unit of the same design.

In general, a water purification apparatus or unit of the present invention is for the reduction and/or removal of any or one or more of the contaminants and impurities in a feed water stream. This can involve the reduction and/or removal of one or more of the following: particles, colloids, bacteria, micro-organisms, ionic species, organic substances.

Typically it will contain at least a water inlet, a pump, one or more de-ioniser, and a water outlet (for dispense of the purified water). Many types and forms of de-ionisers are known in the art, and include, but are not limited to, one or more of the following; reverse osmosis (RO) units or apparatus, electrodeionisation apparatus or units, and ion-exchanger resins. Additionally it may contain pre-treatment filter(s) such as depth filters, ion exchange resin for softening (hardness ion removal), ultraviolet irradiation for bacterial control, ultraviolet irradiation for organic molecule break down, ultra-micro filters and/or ultra-filters for particle, bacterial or organic removal, activated carbon for organic removal, degassing membranes for removal of dissolved gasses such as carbon dioxide and/or reservoirs with vent filters. These technologies are usually each contained in separate modules or cartridges but may be combined within the same module or cartridge.

Such water purification apparatus generally only require connection to nearby water and electricity supplies to be operable. Thus, they are generally independent and/or movable units operating in or at a specific location such as a laboratory. Preferably, at least the majority of the purification actions or processes occur within a chassis, housing or frame. They are intended to provide a purified water stream only, such stream not being in combination with any other substance or compound.

In general, such water purification apparatus and units are intended to provide a purified water stream having a conductivity of less than 30 $\mu$S/cm. This can be equated to a purified water stream having a resistivity of at least 0.03 M$\Omega$·cm. The level of purification may be continued, to provide an output water quality up to and including that of ultrapure water.

Very pure water that is totally free of contaminant ions is often quoted as having an electrical resistivity (referred to as "resistivity") of '18.15' M$\Omega$·cm at 25° C. (due to the slight dissociation of water molecules into hydrogen and hydroxyl ions). This figure is often rounded up to a more general figure of '18.2' M$\Omega$·cm at 25° C. The term "ultrapure water" as used herein refers to a water stream having a resistivity of at least 18.0 M$\Omega$·cm, preferably at or above 18.1 M$\Omega$·cm, and generally referred in the art as a resistivity of "18.2 M$\Omega$·cm" to the nearest decimal point.

The skilled man is aware of the relationship between conductivity and resistivity, such that either one or both measurements can be made by a suitable measurer or meter. The skilled man is also aware that conductivity and/or resistivity measurements or values are temperature dependent. As mentioned above, commonly a temperature of 25° C. is used as a standard temperature when discussing and comparing conductivity and/or resistivity measurements. Apparatus and devices for measuring a conductivity value of a water stream are known in the art, and include in-line conductivity cells. All resistivity measurements mentioned hereinafter are defined at the 'standard' temperature of 25° C. used for such measurements, and which is not therefore listed each time.

Additionally, purity specifications can be made for organic species to content levels of less than 500 ppb of total organic carbon (TOC), preferably less than 50 ppb; bacteria to levels less than 100 colony forming units (cfu) per milliliter, preferably less than 1 cfu/ml; and for dissolved oxygen and/or particles.

A feed water stream to a water purification apparatus may comprise any source of water, generally being a potable water source, generally available to a user from a mains supply or other continuous or large supply or source. Commonly, such a water source is provided from a tap or other standard supply device, having a line or other connection with the water purification apparatus. The introduction of water into the apparatus may be controlled by the use of one or more valves at or near the inlet.

The water purification apparatus may comprise any number of devices, parts, components, lines, etc, including but not limited to one or more of the following: pumps, meters, sensors, oxidisers, de-ionisers, valves, drains, control units and mechanisms, taps, filters, membranes. A typical system may include pre-filters, reverse osmosis, membrane degassing, softening resin, electrodeionisation, ultra-violet oxidation, ion exchange resin and membrane filtration.

Depth filters are typically used as pre-filters within the water purification unit. They are used to remove the bulk of suspended solids including colloids in the feedwater and thereby protect downstream purification technologies from fouling and clogging. They are changed periodically as they get fouled with the particles they have removed thus limiting their ability to remove further particles and/or increasing the pressure required for the water to flow through the filter.

Activated carbon is used in pre-treatment to remove chlorine and chloramines to prevent oxidative damage to downstream membranes and ion exchange resins. The activated carbon may be granular or included into a depth filter. Organic or particulate fouling or bacterial growth can reduce the effectiveness of the activated carbon and periodic changes are required, typically after less than 1 year such as every 6 months.

Reverse Osmosis (RO) is a membrane process where high pressure water passes through the membrane to form a permeate stream. Contaminants in the feedwater down to the size of ions, are rejected i.e. do not pass through the membrane, and exit the RO module in a concentrate stream. The membranes can build up fouling of organics, bacteria or precipitates over time, and/or the membrane can become oxidised, which opens up the pores in the membrane, thus allowing greater flow of unwanted ions through the membrane. Any of these actions can lead to a requirement for infrequent replacement of the membranes, typically after 3-5 years.

Degassing membranes uses hydrophobic membranes to extract gases such as carbon dioxide or oxygen from the inlet water. A sweep gas or vacuum accepts the gas and the rate is depending upon the partial pressures of the gases across the membrane and the permeability of the membrane. Over time the membrane permeability can reduce and replacement of the cartridges is required, typically after 1-3 years.

Ion exchange typically uses beads of resin that have functional groups as active sites, either anionic or cationic. They are used to exchange an ion from the incoming water with one that is attached to the functional group. Softening uses sodium form resin to replace hardness ions such as calcium from the incoming water and is used where the calcium would precipitate in the later processes. The amount of hardness ions that can be removed is limited by the amount of functional groups on the resin and when this limitation is being approached, unwanted ions can start passing into the outlet water. Therefore the cartridge of resin beads requires exchanging dependent upon the amount of sites present in relation to the water treated. This period is typically 3-6 months.

Electrodeionisation uses ion exchange resin to extract the incoming ions from the water but then an electro-motive force is used to transport the ions through selective ion permeable membranes into a concentrate stream. Various designs of electrodeionisation module are known in the art. The performance of electrodeionisation modules can reduce with age due to precipitation or fouling of the resins or membranes requiring infrequent change of the module, typically 5 years.

Ultraviolet light is passed through the water to act as a bactericide and/or to decompose organic compounds or substances in the water to form ionic or charged species which can then be removed on ion exchange resin, and its operation is well known in the art. Apparatus and instruments for providing suitable ultraviolet light typically involve low pressure mercury lamps or light emitting diodes to emit ultraviolet light at one or more specific wavelengths, such as at 254 or 185 nanometers, in an area or space through which the water passes. As the UV light emitter ages the amount of UV light that passes through the water reduces and the UV emitter eventually requires replacement to maintain the production of water of the desired quality, typically after 12 months.

To achieve ionic purity of ultrapure water quality, water purification equipment and systems typically include one or more dedicated final ion exchangers (IX), usually but not limited to containing one or more resins, typically a mixture of anion and cation resins. These resins contain a large number of active sites on which the "impurity ions" in the water entering the resin cartridge are taken up. In so doing, they replace hydrogen and hydroxyl ions which recombine to form water. When the active sites are used up or approaching being used up then the impurity ions start to pass through the cartridge into its product water. These ions present in the ion exchange cartridge product water reduce its resistivity, and when a pre-determined drop in resistivity is detected, it is normal for an alarm to be raised by the water purification unit and the user will replace the ion exchange cartridge with one containing unused resin. Typical change periods can be weeks or a few months if the cartridge is fed with reverse osmosis permeate, but this can be increased to over 1 year if fed by EDI product water.

Final filters are used as a final extraction before the water leaves the water purification apparatus to remove particles, microorganisms and large organic molecules such as endotoxins and nucleases. The pore sizes are <1 μm (micrometer) with some ultra-filters having pores <1 nm (nanometer). The pores can become blocked with use or bacteria may grow through the membrane thus necessitating change of the membrane, typically after 6 or 12 months.

Vent filters are installed on reservoirs that make up part of the water purification apparatus, and allow gas/'air' into and out of the reservoir when emptying and filling the reservoir respectively to avoid pressure changes inside the reservoir. They contain hydrophobic microporous filters to prevent particles including bacteria entering the reservoir and may also use absorptive media to remove carbon dioxide from the air so maintaining the quality of the water held in the reservoir. They required periodic change to maintain the effectiveness of performance, typically after 6 or 12 months.

The water purification apparatus will typically also include pumps, valves, control boards and tubing. Pumps can fail after long usage, most commonly by wear of the motor's brushes. Electro-mechanical valves can fail due to mechanical wear, fouling or coil failure. Control boards can fail due to capacitor or transistor wear and this may be exacerbated by fluctuations in the electric input and output and if any fans present fail due to wear. All of these components would be expected to last more than 1 year but may fail over the several years of the unit's operation.

The tubing that is used to connect the input, various technologies and output within the water purification unit may also become embrittled over time or contaminated with fouling, particularly bacterial biofilm. Sanitisation can be partially successful in removing or pacifying the biofilm but the most effective remedy is often changing of the tubing. Given the amount of connections within a unit this is unlikely ever to be carried out on a customer's site.

The water purification unit or apparatus typically has a make up section that part purifies the water from the inlet and adds the water to a reservoir, and a recirculation section which recirculates the water in the reservoir through further treatment technologies, past a, or several, point(s) of take off to the desired location of the purified water, and back to the reservoir. This recirculation circuit may include flowpaths that are not part of the water purification unit.

The recirculation circuit including reservoir will typically hold sufficient volume of water to allow one or more portions of product water to rapidly be taken off from a point of use outlet, prior to the need to introduce more make up water into the circuit.

Recirculating a purified water stream through at least a portion of a water purification apparatus is well known in the art. Typically it is intended to maintain the highest purity for the water stream by its re-passage through one or more of the purification processes or technologies, and by its continual movement, minimising water stagnation which provides an opportunity for any remaining bacteria and/or micro organisms to adhere to a surface and grow.

The dispense of at least a portion of the product water stream can be provided through any form or type of outlet or outlets, optionally being co-ordinated or separate. Stopping of the dispense of the product water stream may be carried out by the operation (usually through a controller) of one or more parts or components of the water purification circuit or parts or components of the attached analyser or other equipment, such as a 2-way valve able to move between a dispense position and a recirculating position.

An emergency bypass may be included that allows the analyser to complete its current set of analyses by allowing feedwater to be purified by the final ion exchange unit in the event of a power failure or failure of upstream components. The emergency bypass may be enabled by a battery power source for the required time.

In one embodiment of the invention is provided a water purification unit designed such that each of the technologies within the water purification unit is designed to operate for a minimum period, for example at least 1 year. This will typically involve the inclusion of technologies that minimise the amount of material that is required which is limited in its removal capability by the amount of capacity for removal that the material possesses. For example reverse osmosis deionisation and electrodeionisation are used prior to final ion exchange deionisation.

The water purification unit is designed with minimal connections, preferably of a quick connect design, and a compact build so that it is easily removable and replaceable by a second water purification unit of identical design after the minimum period, and the first water purification unit is then returned to a central location of the supplier. There may be one or more central locations as determined by geographical and logistic reasons.

The water purification unit may be made from a frame of stainless steel, or similar, struts and plates that are connected together by fastenings such as rivets that enable replacement of single struts if damage occurs. The various components are attached to the struts either directly or with the aid of brackets as required. Around the outside of the frame is a cover to protect the components, including the wires and tubes, from external contact and damage. When the unit is exchanged a transit cover will be fitted that may be of stronger material than the on-site cover with the on-site cover being moved from the old unit to the new and the transit cover moved from the new unit to the old prior to its return to the central location of the supplier. The transit cover may include recording information to determine if the unit has received an adverse incident such as a shock incident, or experienced an adverse environment such as a temperature extreme, during transit.

The frame of the water purification unit may be laser etched with an identification number and when the supplier receives the returned water purification unit, it will be entered into the an electronic records system which identifies the history of the unit and its current components. Each of the components in the water purification unit may include a barcode or similar identification to further add to the traceability and recording of the components' history and usage. To aid this the processor of the water purification unit may also by interrogated to obtain data, files or suchlike that contain information on the usage of the unit while with the customer, such as total operating time, water qualities into and out of each component, usage patterns etc.

The supplier may use this data on the history and functioning of each component, as well as potentially testing the component(s) at standard test conditions of, for example, feedwater flow rate, pressure and/or ionic quality, to assess the status of each component and determine if it requires replacement or refurbishment.

Some of the components that are capacity rated such as filters and resin packs as well as certain components of limited lifetime such as ultra-violet irradiation light sources may be exchanged automatically but they may still be investigated first to gain information regarding the unit's performance while with the customer, especially if that information will have affected components later in the process.

Pumps may be exchanged or have parts such as brushes changed automatically or after assessing the total usage they have undertaken.

Other components such as degassing membranes, electrodeionisation modules and reverse osmosis modules that do not have capacity limitations but may suffer a decrease in performance due to, for example, fouling, may be tested as part of the refurbishment process and a decision on replacement then made based on age, performance in the unit while with the customer and/or performance when tested at standard conditions. New barcodes may be fitted to components not replaced as part of the refurbishment process.

Tubing, valves and processor boards may be replaced as lifetime experience dictates to minimise the risk of unit malfunctioning during the unit's forthcoming customer placement.

Once the water purification unit has been refurbished the data, identification barcodes etc. will be recorded in the supplier's electronic record systems so that the history of all components is recorded for future purposes.

The water purification unit is then tested against quality control parameters and prepared with a transit cover for shipment to a new customer site where it will be ready for installation within an analyser or similar equipment.

The replacement and refurbishment of components at the supplier allows for cost effective recycling of components parts. For example plastic materials can be recovered from cartridges, tubing etc.; mercury can be reclaimed from ultraviolet light sources; ion exchange resins can be regenerated for re-use; electrodeionisation modules can be rebuilt with fresh resins and membranes thus re-using the plastic components and the electrodes including the precious metal anodes; reverse osmosis modules can be refitted with new membranes; new brushes can be applied to pumps extending life of the majority of the components; new fans fitted to power supplies; etc.

A second embodiment of the invention uses two or more sections of material with limitations of capacity in parallel cartridges or modules such that only one of the cartridges or modules is used at any time within the year. This allows for maximum throughput or water with minimal periods of rinsing which some technologies require prior to water being passed through to product.

A third embodiment of the invention is a system for replacement of water purification units on multiple sites by operation of the water purification systems on site for a specific period, returning the water purification units to a central location, refurbishment of the water purification units and sending the refurbished units to sites for re-installation.

BRIEF DESCRIPTION OF THE DRAWINGS

Embodiments of the present invention will now be described by way of example only, and with reference to the accompanying drawings in which.

DETAILED DESCRIPTION OF THE EMBODIMENTS

Figure 1:
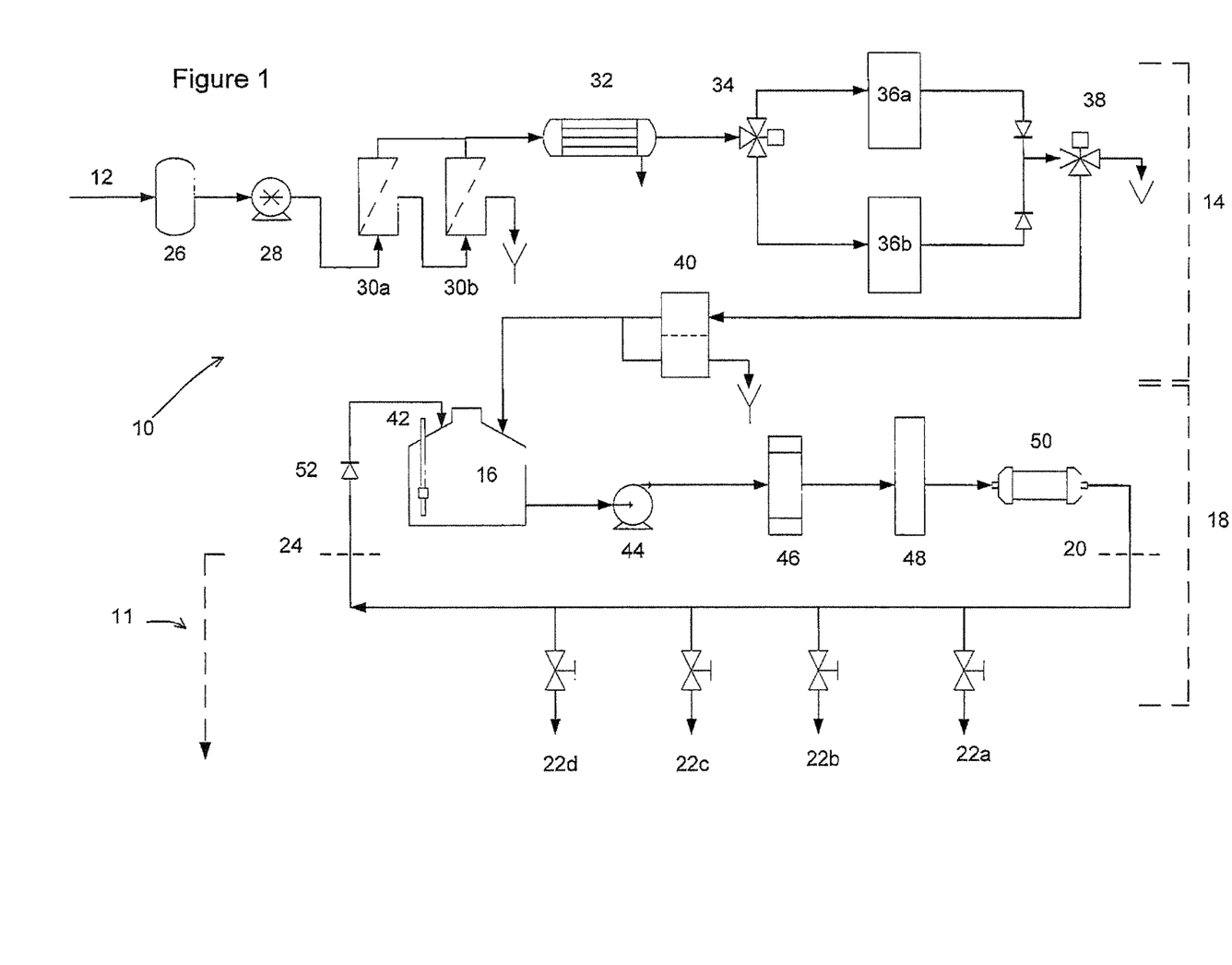
FIG. 1 is a flow schematic of a water purification unit of the invention.

FIG. 1 shows a water purification unit 10 working in combination with the connections to and inlet valve parts of an analyser 11. The water purification unit 10 comprising an inlet 12, a make up section 14 feeding a reservoir, 16, the water purification unit 10 also having a recirculation section 18 that connects to, and operates with, the analyser 11. This recirculation section exits the water purification unit 10 at a point 20 and passes through one or more points of take off as required by the analyser, four are shown as an example 22a-d, before re-entering the water purification unit 10 at point 24 and returning un-dispensed water to the reservoir 16. The make-up section comprises a flowpath that carries the water from the inlet 12 through a number of technologies that remove different contaminants from the water creating a series of part purified waters of increasing purity. The water passes through a pre-filter 26 which may be a 5 micron depth filter to remove particles in the feedwater. Optionally activated carbon to remove chlorine or chloramines from the feedwater may be added to the filter or alternatively may be housed in a separate module.

The water is then pumped via pump, 28, into a reverse osmosis stage which removes ions and larger matter from the water. FIG. 1 shows two reverse osmosis membranes 30a-b connected with their concentrate sides in series and permeates in parallel. If a higher permeate flow is required than the two membranes can produce then more reverse osmosis modules may be added using a similar configuration.

The permeate is then passed through a de-gassing membrane 32 to a 3-way valve 34. This passes the part purified water through one of the two parallel ion exchange resin softening cartridges 36a-b which exchange hardness forming ions such as calcium for sodium. When these cartridges have not been used for a while, the water in the cartridge becomes contaminated with ion exchange break down products such as sulfonated polystyrene molecules. These would contaminate downstream processes so are rinsed to drain when starting the make up stream, via three way valve, 38. The part purified water then passes through an electrodeionisation module, 40 which further removes ionic species from the water before entering the reservoir 16. A level monitoring system 42 is installed in the reservoir and this in combination with the controls for the unit (not shown) is used to activate and de-activate the make up process.

The recirculation section is active whenever there is enough water in the reservoir 16 and incorporates a recirculation pump, 44, a ultra-violet light oxidation and bactericidal module, 46, an ion exchange module 48, to remove the final traces of ionic species, and a micro-filter, 50, as a final particle removal stage before the water exits the water purification unit at exit point 20 and is passed to the points of use before any unused water is returned to the water purification unit at point 24. A pressure sustaining valve 52 prior to the reservoir 16 ensures that the water throughout the recirculation flowpath is maintained at a high enough pressure to be dispensed from take off points 22a-d as and when required by the user or analyser.

Figure 2:
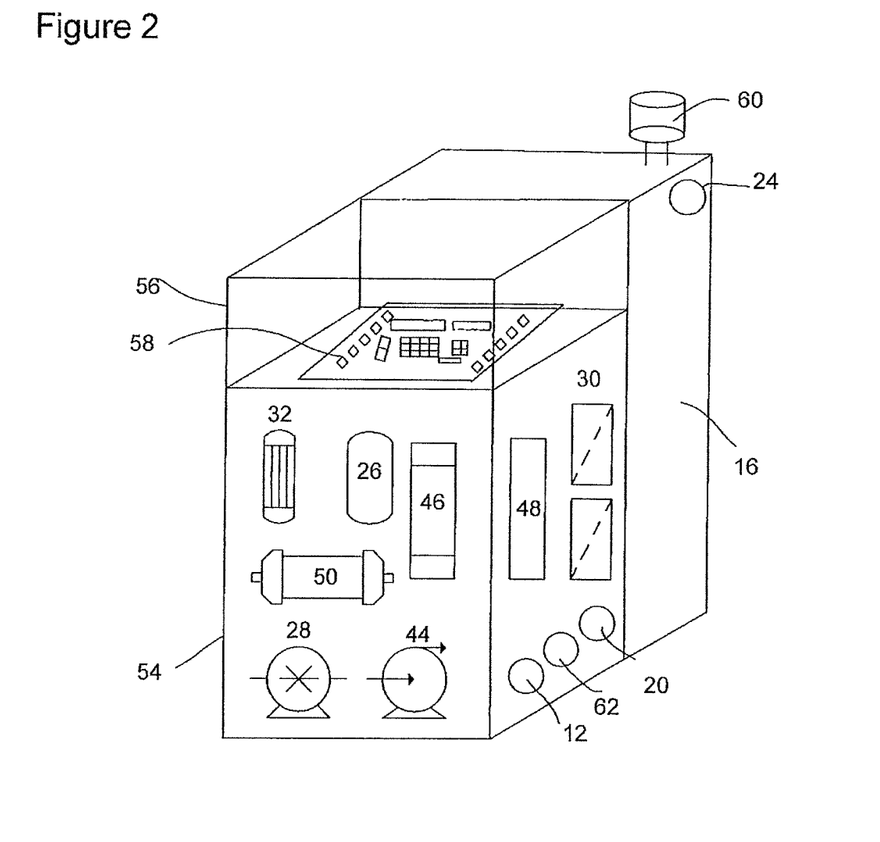
FIG. 2 is a drawing of a water purification unit of the invention detailing the electrical and flow connections.

FIG. 2 shows a diagrammatic representation of a unit of the current invention. It incorporates a chassis 54 onto which the various purification modules (26, 30, 32, 46, 48, 50) and other flowpath components (28, 44; 34, 38, 52 not shown) are mounted. Above the water section is a control box 56 for the control board 58 and other associated electrical components. Mounted behind the water purification components is the reservoir 16 onto which is sited a composite vent filter 60 which maintains the cleanliness of the air passing into the reservoir when the level in it is reducing during a period of water usage. On the side of the chassis are the feedwater inlet, 12, drain, 62, outlet to points of use 20 and return from the points of use 24.

Figure 3:
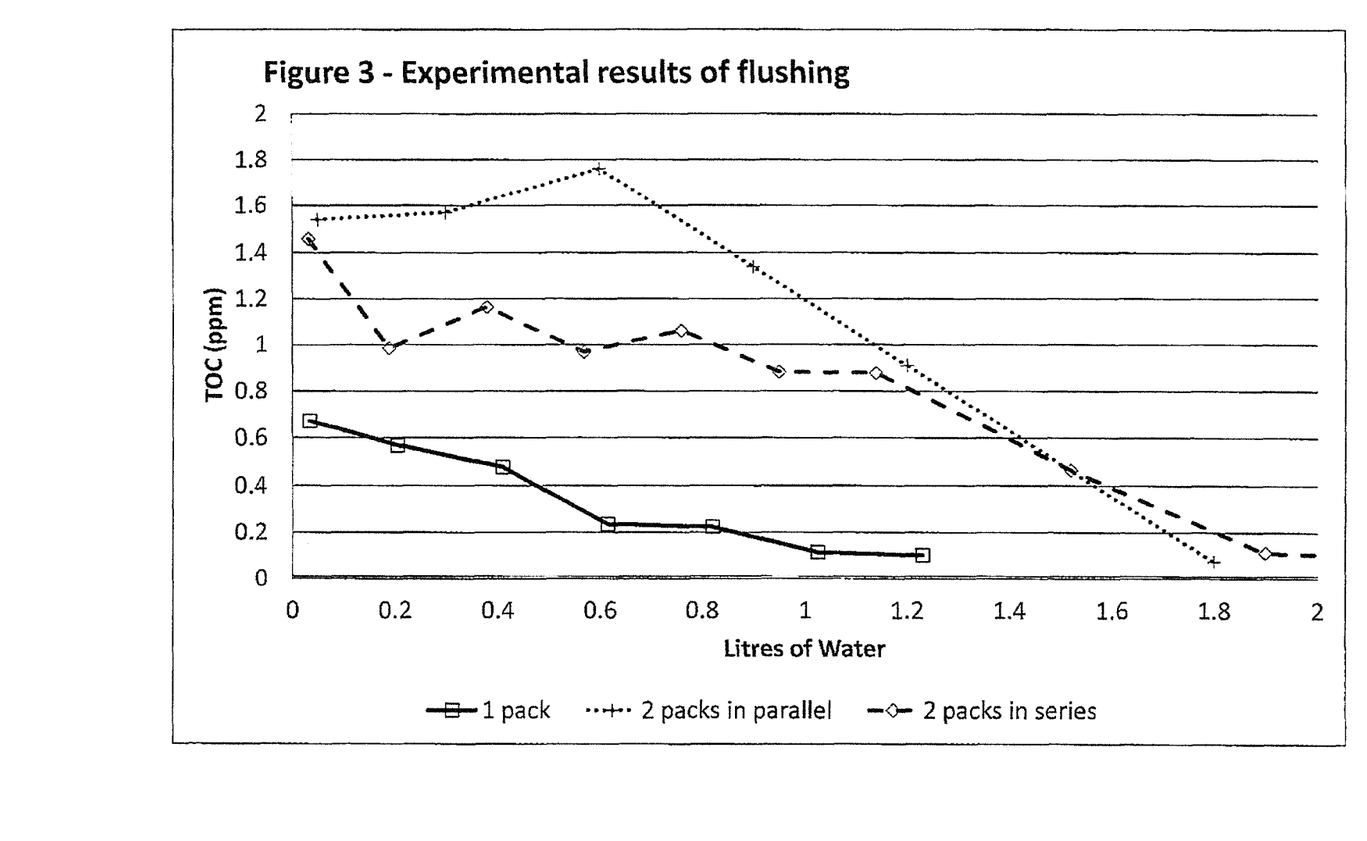
FIG. 3 is a graph showing rinse up of single and multiple cartridges of sodium form ion exchange resin.

FIG. 3 shows the results of an experiment to determine the length of time that the 3 way valve 38 needs to operate for, prior to water being passed to the reservoir 16. In the test, deionised water with TOC <5 ppb was fed at 0.4 liters per minute into cartridges of 2 liters of SR1L sodium form cation exchange resin for 16 hours so that the outlet from the cartridges was steady and well below an acceptable TOC limit of 0.1 ppm. The cartridges were then allowed to stand with water therein for 1 hour before the deionised water was restarted. The TOC out of the cartridges was then measured over time. Three runs were carried out to replicate the potential situations that could be used in a unit containing the 4 liters of resin that would be required to last 1 year;
 a) using two packs one at a time,
 b) using two packs in parallel and
 c) using two packs in series.

In FIG. 3 it can be seen that operating with one pack at a time results in the TOC out of the cartridge being significantly lower than with two packs, either in parallel or series, and so the time period where valve 38 passes water to drain rather than to the EDI, 40, and reservoir, 16, is significantly shortened and less water is wasted per operational cycle.

Figure 4:
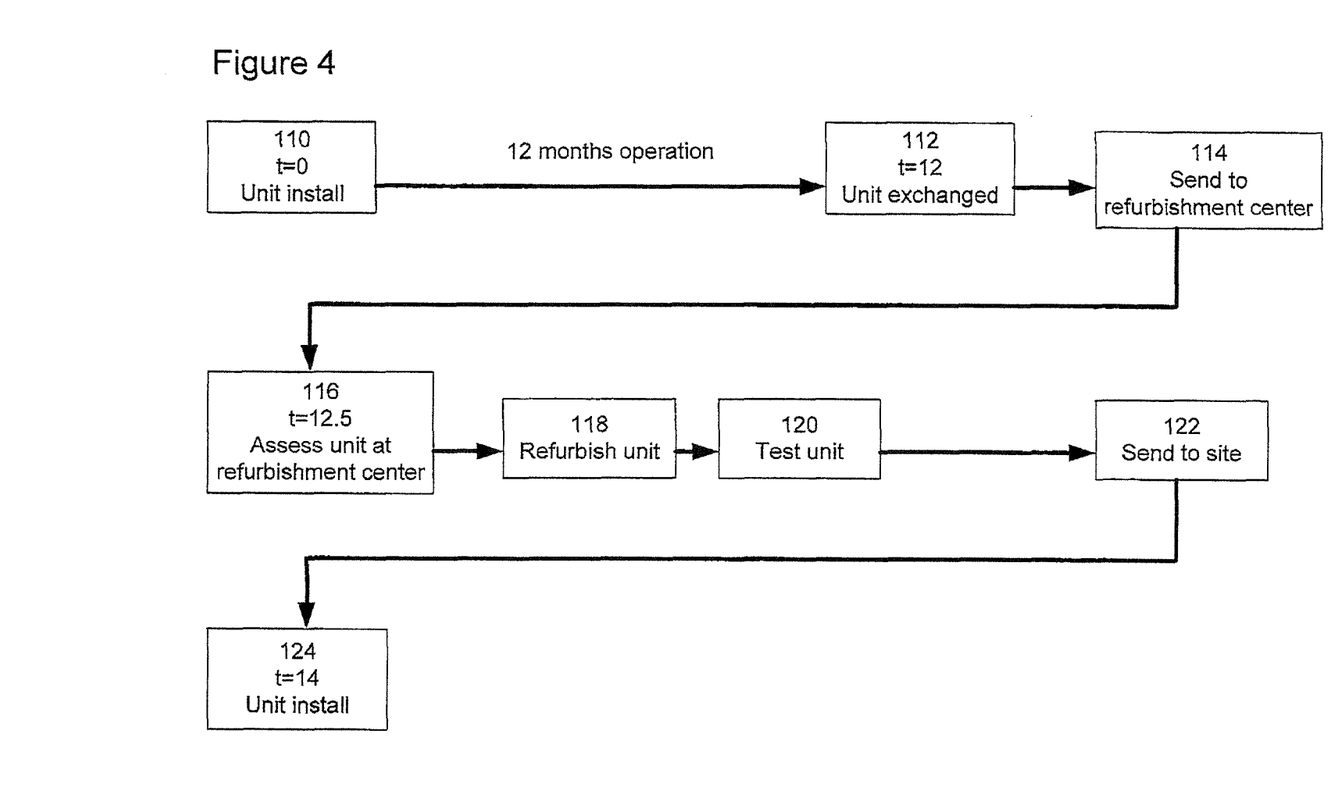
FIG. 4 is a schematic showing the return and refurbishment process.

FIG. 4 shows how a unit will progress against time during its life. From installation at time (t)=0 months, 110, it will be taken out at t=12, 112, when it will be replaced by another unit that had been sent from the refurbishment centre the month before either to the site of use of to a local delivery point such as a local representative. The removed unit will then be returned to the refurbishment centre in the packaging that the replacement unit was sent in, 114. A 2 week period is allowed for this so at t=12.5 the unit is at the refurbishment centre for refurbishment.

The refurbishment process will involve an initial assessment, 116, of the state of the unit. This may involve running of the unit or specific parts of the unit such as pumps and valves to check on their performance. It may also involve checking records so that no part can exceed a set number of years usage, for example a 2 year limit may be placed on said pumps or valves. Parts of the components may also be replaced to extend life. The unit will then pass with multiple other units into the refurbishment process, 118.

Ion exchange modules are typically made from plastic containers with ion exchange resins inside. The resins from the multiple units being processed can be reclaimed and bulked for regeneration for use in this or, more likely, other applications. The plastic can also be bulked making recycling an economic possibility. Plastic tubing may concurrently also be replaced and recycled.

Once refurbished the unit will be tested, 120, and sent to a site (not the original one) 122, for installation when the previous unit there reaches its exchange time, 124, say at t=14 months.

Figure 5:
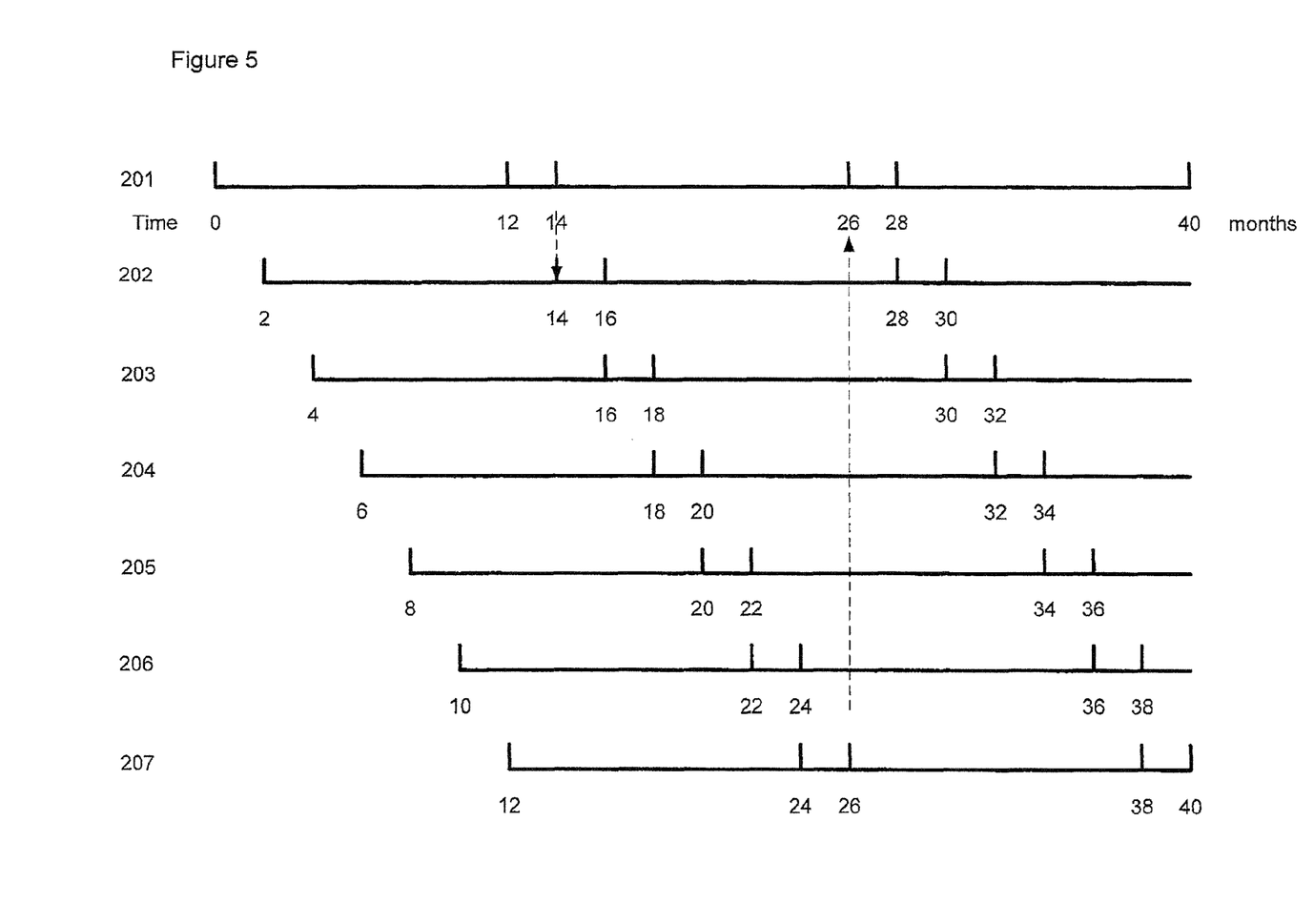
FIG. 5 is a schematic showing the timeline of multiple units.

FIG. 5 shows how a number of units will work over a number of sites under the process as described above. Unit 1, 201 on site 1, will operate for 12 months from t=0 to t=12. It will then be refurbished from t=12 to t=14 and be sent to a second site from which a second unit, 202, has been operating from t=2 to t=14. The first unit will then operate at the second site from t=14 to t=26 and be refurbished during months t=26 to t=28 before being used on a third site from t=28 to t=40. The process is repeated with a 14 month cycle of placement of the unit at a different site where it operates for 12 months.

Similar to unit 1, unit 2, 202 replaces unit 3, 203, on site 3 after 16 months, unit 3, 203, replaces unit 4, 204, after 18 months, unit 4, 204, replaces unit 5, 205, after 20 months, unit 5, 205, replaces unit 6, 206, after 22 months and unit 6 replaces unit 7, 207, after 24 months. This unit 7, 207, may be the unit that is used to replaced by unit 1, 201, at 26 months.

This leads to a minimum number of units being required to run this system as defined by the equation:

$$\text{Number of units} = \frac{\text{Number of sites} \times (\text{Time in use} + \text{Time to refurbish})}{\text{Time to use}} \quad \text{Eq. 1}$$

where the time to refurbish must include all the transport times detailed in FIG. 4.

Therefore, as an example, if there are 800 sites and the units are operated for 12 months with a 3 month period for refurbishment including all transport times, then the number of units required would be 1000.

The invention claimed is:

1. A method for facilitating maintenance of water treatment apparatus operated at multiple locations comprising the steps of:
 a. providing at least a first and a replacement water treatment apparatus, each apparatus including at least a water inlet connectible to a water source and a water outlet for dispensing of purified water and the following components:
  a pump,
  one or more de-ionisers,
  wherein each of the components of the apparatus is designed with an operational life that is greater than a pre-determined apparatus exchange duration;
 b. tracking the usage of each component in each apparatus;
 c. supplying the first water treatment apparatus to a location;
 d. determining an exchange date for the apparatus at the location, the exchange date calculated from a date that the first apparatus is supplied to the location and adding the apparatus exchange duration;
 e. sending the replacement water treatment apparatus to the location when the first water treatment apparatus at the location is at or near its exchange date, and defining the first water treatment apparatus as a used water treatment apparatus;
 f. retrieving the used apparatus at that location to a refurbishment centre;
 g. determining an operational life remaining for each component in the used water treatment apparatus based on the usage of the component;
 h. removing and replacing, or refurbishing each component in the used water treatment apparatus that has an operational life remaining that is less than the predetermined apparatus exchange duration, to provide a new replacement water treatment apparatus as defined in step (a); and
 i. using the new replacement water treatment apparatus to replace a water treatment apparatus at or near its exchange date at the same or a different location.

2. A method for facilitating maintenance according to claim 1 wherein the de-ionisers in each apparatus include
 a reverse osmosis unit,
 an electrodeionisation unit, and an ion-exchange unit,
each apparatus further including
an ultraviolet irradiation unit,
a degassing membrane for removal of dissolved gasses,
and fluid conduits for supplying a stream of water to the de-ionisers.

3. A method for facilitating maintenance according to claim 1 wherein the ion-exchange includes resins in a plastic housing, and wherein the resins from the ion-exchange unit are reclaimed and the plastic housing is recycled.

4. A method for facilitating maintenance according to claim 3 wherein each of the components in each water purification apparatus is marked with an identification code for tracking the usage and refurbishment history of the component.

5. A method for facilitating maintenance according to claim 3 wherein each apparatus includes a frame for housing the components, and wherein the frame of each apparatus includes an identification code for tracking the usage and refurbishment history of the apparatus.

6. A method for facilitating maintenance according to claim 1 wherein each replacement water treatment apparatus is tested prior to sending to the same or different location.

7. A method for facilitating maintenance according to claim 1 wherein the refurbished apparatus is provided in a transit cover configured to protect the apparatus; and wherein the apparatus being replaced has a field cover, the process further involving the steps of removing the field cover of the apparatus being replaced; removing the transit cover; placing the field cover on the refurbished apparatus and placing the transit cover on the apparatus being replaced.

8. A method for facilitating maintenance of multiple water treatment apparatus at multiple locations comprising the steps of:
distributing a plurality of water treatment apparatus to multiple, respective locations, each apparatus being associated with a location for an exchange duration, each apparatus including at least the following: a water inlet connectible to a water source, fluid conduits for supplying a stream of water to the components, a water outlet for dispensing of purified water and the components: a pump, a reverse osmosis unit, an electrode-ionisation unit, an ion-exchange unit, an ultraviolet irradiation unit, a degassing membrane for removal of dissolved gasses, and wherein each of the components of the apparatus has a predetermined operational life that is greater than the exchange duration for each apparatus;
tracking the usage of each component in the water purification apparatus;
determining an exchange date that the apparatus at the respective needs to be replaced, the exchange date being calculated from a date that the apparatus is supplied to the location and adding the exchange duration;
sending a replacement water treatment apparatus to the respective location when the water treatment apparatus at the location is at or near its exchange date;
defining the water treatment apparatus as a used water treatment apparatus;
retrieving the used apparatus at that location to a refurbishment centre;
determining an operational life remaining for each component in the used apparatus based on the usage of the component; and
refurbishing or replacing each component in the used apparatus that has an operational life remaining that is less than the exchange duration for creating a new replacement water treatment apparatus ready for distributing; and
sending the new replacement apparatus to another location to replace another apparatus at or near its exchange date.

* * * * *